United States Patent [19]
Valentine

[11] Patent Number: 5,898,770
[45] Date of Patent: Apr. 27, 1999

[54] SUBSCRIBER CONTROLLED CALL LIST DEREGISTRATION

[75] Inventor: Eric L. Valentine, Plano, Tex.

[73] Assignee: Ericsson Inc, Research Triangle Park, N.C.

[21] Appl. No.: 08/719,693

[22] Filed: Sep. 26, 1996

[51] Int. Cl.⁶ ..................................................... H04M 3/42
[52] U.S. Cl. ......................... 379/249; 379/88.19; 379/210
[58] Field of Search ................................... 379/67, 88, 89, 379/90.01, 92.01, 92.02, 93.12, 93.13, 120, 126, 127, 142, 188, 196, 197, 198, 201, 207, 209, 210, 242, 243, 244, 245, 246, 249, 265, 266, 354, 355, 67.1, 88.16, 88.18, 88.19, 88.2, 88.21, 88.22

[56] References Cited

U.S. PATENT DOCUMENTS

| 4,277,649 | 7/1981 | Sheinbein | 379/142 |
|---|---|---|---|
| 4,930,152 | 5/1990 | Miller | 379/214 |
| 5,206,900 | 4/1993 | Callele | 379/142 |
| 5,361,295 | 11/1994 | Solomon et al. | 379/67 |
| 5,467,388 | 11/1995 | Redd, Jr. et al. | 379/196 |
| 5,559,867 | 9/1996 | Langenskamp et al. | 379/69 |
| 5,651,053 | 7/1997 | Mitchell | 379/67 |

FOREIGN PATENT DOCUMENTS

| 0510411 | 10/1992 | European Pat. Off. . |
|---|---|---|
| 0564192 | 10/1993 | European Pat. Off. . |
| 0588101 | 3/1994 | European Pat. Off. . |
| WO 96/06413 | 2/1996 | WIPO . |

Primary Examiner—Scott L. Weaver
Attorney, Agent, or Firm—Jenkens & Gilchrist

[57] ABSTRACT

An apparatus and method within a communication switch for prompting a telemarketing organization to remove a consumer phone number from a call list includes a call list deregistration system which establishes a phone connection with a telemarketing organization phone and plays a specified message on the successful connection. Entry of a specified code on a telephone keypad activates the system to establish a connection with the telemarketing orgainization and play a specified message thereto. The specified message includes an identification of the consumer (called party) usually in the form of a phone number. Other aspects of the disclosure include the use of an alternate number bank for specified deregistration call back numbers and the use of a store for maintaining a list of those numbers which have been called back and to which the specified message has been played to request removal from the call lists.

12 Claims, 5 Drawing Sheets

SUBSCRIBER CONTROLLED CALL LIST DEREGISTRATION

FIELD OF THE INVENTION

This invention relates to an apparatus and method within a telephone communications switch for providing a telephone subscriber feature to establish a call back to a specified phone and play a specified audio message directed thereto.

BACKGROUND OF THE INVENTION

In today's information age, peaceful and quiet evenings at home are becoming increasingly rare. Telemarketing organizations are proliferating and the number of calls initiated thereby are increasing to the point that many people feel continuously under assault by the telemarketing industry. It is not uncommon for a person to receive multiple telemarketing calls in one night. Certainly, large numbers of people trying to enjoy a quiet evening at home are frequently frustrated by the continuously ringing phone.

For a small charge, telemarketers can buy a file that contains the details of one's personal life including education, training, income and spending habits. Information about consumers is continuously accumulated by and exchanged between many telemarketing organizations. Once found by one telemarketing organization means once found by all telemarketing organizations. Thus, the data information world chases the peace and quiet loving consumer from cradle to grave.

Moreover, because the telemarketing information world continuously accumulates and shares information among its members, an individual may wind up on information lists or target lists throughout the nation in a manner of days or weeks as a result of just one purchase by phone. Thus, in a short period of time, one could easily wind up having more telemarketing organizations than friends knowing and calling one's phone number.

This invasion by telemarketers has become a significant concern. Many governments of industrialized nations are addressing the problem through legislation. For example, the Canadian Radio-Television and Telecommunications Commission (CRTC) has banned the use of automatic dialers commonly used in telemarketing and has put other restrictions on telemarketers. The CRTC ruled that telemarketers must remove consumers from calling lists within thirty days of a request by the consumer. Here in the United States, the Federal Telephone Consumer Protection Act of 1991 requires telemarketing organizations to remove a consumer's name off of its lists whenever requested to do so by the consumer. The problem under the Federal Telephone Consumer Protection Act, however, is that the consumer must make the effort to establish contact with the telemarketing organization to convey such a removal request. Requesting that one's name be removed from a telemarketing list is easier said than done.

One way of establishing contact to request removal from a telemarketing organization call list is to actually take the telemarketing call. Having to personally reject a telemarketer's sales pitch, however, is an uncomfortable task for many people. Moreover, taking the call can be time consuming. If a pre-recorded message is being played, one must wait until the end of the message to reach a live person or to obtain a number to call back.

Many different steps have been taken to respond to this invasion of privacy and obtain freedom from telemarketer calls. Unfortunately, significant effort and diligence is required to remain a recluse in the information age. One solution is to buy an answering machine and to screen all incoming calls to avoid fielding calls from telemarketers. However, this solution means that a consumer can not use their phone service in the manner in which it is intended and for which the consumer pays a monthly telephone service charge. Moreover, screening calls is not always practical. This is especially true since telemarketers seem to have a propensity for calling at inconvenient times.

Another solution that is available but that has not yielded completely satisfactory results is that of writing the Direct Marketing Association, an industry trade group, to ask the Association to remove one's name from the calling lists of its member organizations. It is known that this eliminates much telemarketing activity. However, a letter to the Direct Marketing Association does not stop local businesses, charities, credit card issuers or anyone who buys information lists from a multitude of other sources. This solution is also temporary because the next purchase made from a catalog company may land the consumer right back on the Direct Marketing Association's mailing list.

Each of these solutions can require significant effort and time on the part of the consumer. Cumulatively, the problem is worse. A consumer could be forced to spend unacceptable amounts of time making requests to the multiple telemarketing organizations to be taken off the various call lists. Keeping one's name off these lists can seem like a full time occupation. Thus, what is needed is a system which does not require the consumer to buy additional equipment and which minimizes the amount of time and effort the consumer must expend in order to repel this invasion of privacy by the telemarketing industry.

SUMMARY OF THE INVENTION

In a communications switch, a call list deregistration system and method for prompting a telemarketing organization to remove a phone subscriber's name or phone number from a call list is provided. To actuate the call list deregistration system, a consumer enters a specified code after receipt of a telemarketing call. The call list deregistration system responds thereto by generating a call back to that telemarketer's phone, as identified by its caller ID, and then playing a specified message which informs the telemarketing organization to remove the consumer from the telemarketer's call list.

The call list deregistration system uses, as part of standard communications protocol, the caller ID in placing the call back. In order to avoid tying up the consumer's phone, however, the call list deregistration system uses a specified generic caller ID number rather than the consumer phone caller ID number when routing the call to the telemarketer phone.

A deregistration number store is provided in the call list deregistration system for maintaining a list of caller phone numbers and of consumer phone numbers as well as a date. A processing unit sends, following each telemarketer call back, a signal to the deregistration number store including the phone number of the consumer phone, an identifying number, such as a phone number or caller ID number of the telemarketing organization, and a date. The storing of these numbers may then be used for evidentiary purposes to establish that a call list deregistration request was made.

DETAILED DESCRIPTION

Figure 1:
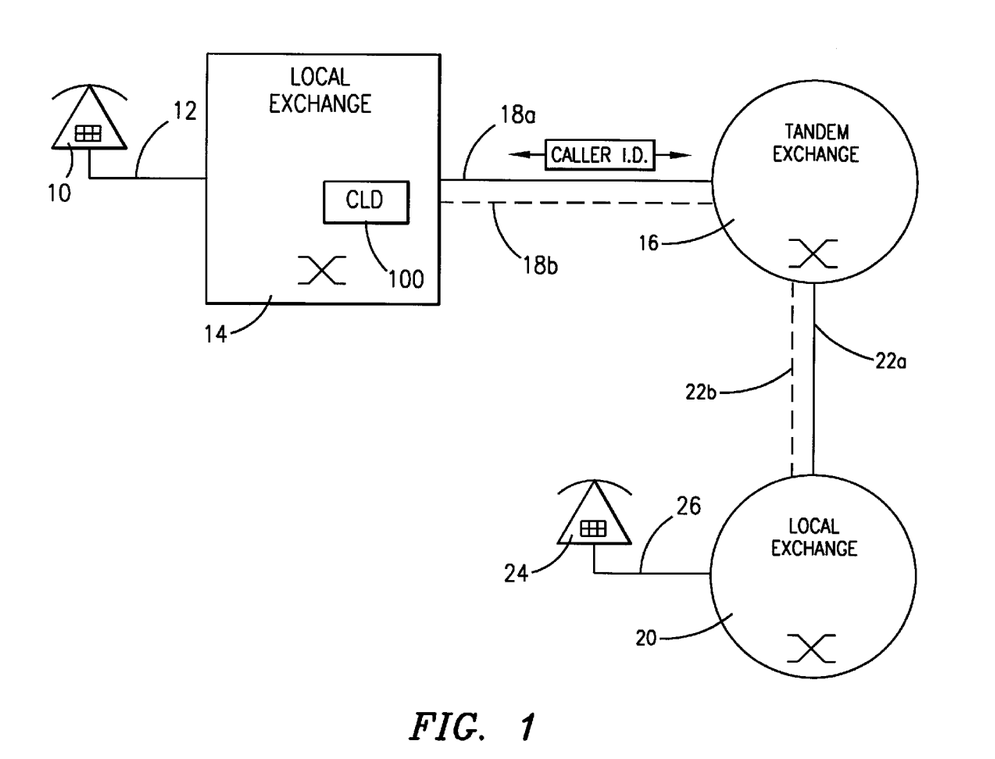
FIG. 1 is a block diagram of a public switched telephone network in which the present invention may be implemented.

Referring to FIG. 1, a block diagram of a public switched telephone network is shown which includes the call list deregistration system 100 (hereinafter "CLD" 100). As may be seen, consumer phone 10 is connected to a local exchange 14 by line 12. CLD 100 is shown only in local exchange 14 for the purpose of illustrating its operation in relation to consumer telephone 10. It is envisioned that CLD 100 type systems may be located in every local exchange. The local exchange 14 is coupled to tandem exchange 16 by voice trunk 18a and signaling line 18b. Tandem exchange 16, in turn, is coupled to local exchange 20 by voice trunk 22a and signaling line 22b. Finally, local exchange 20 is coupled to telemarketer phone 24 by line 26. While only one tandem exchange 16 is shown in FIG. 1, it is understood that a plurality of tandem exchanges 16 may form a part of telecommunications connection between telemarketer phone 24 and consumer phone 10.

When a telemarketing organization initiates a call from telemarketer phone 24 to consumer phone 10, the call routing is initially performed by local exchange 20 to reach local exchange 14 which, as indicated before, is coupled to consumer phone 10. The system of FIG. 1 further illustrates that the routing initiated by local exchange 20 involves setting up a connection through tandem exchange 16. It is understood that both telemarketer phone 24 and consumer phone 10 may be coupled to the same local exchange 14 or, that the call may be routed through multiple tandem exchanges 16. Moreover, this invention may be used in conjunction with any routing network, including SS7, which is capable of supporting the call back feature. While SS7 networks are the newest technology for the routing and control of phone lines, the invention herein includes SS7 networks as well as other and older types of networks which do not use common channel signaling techniques as is known to those skilled in the art.

Figure 2:
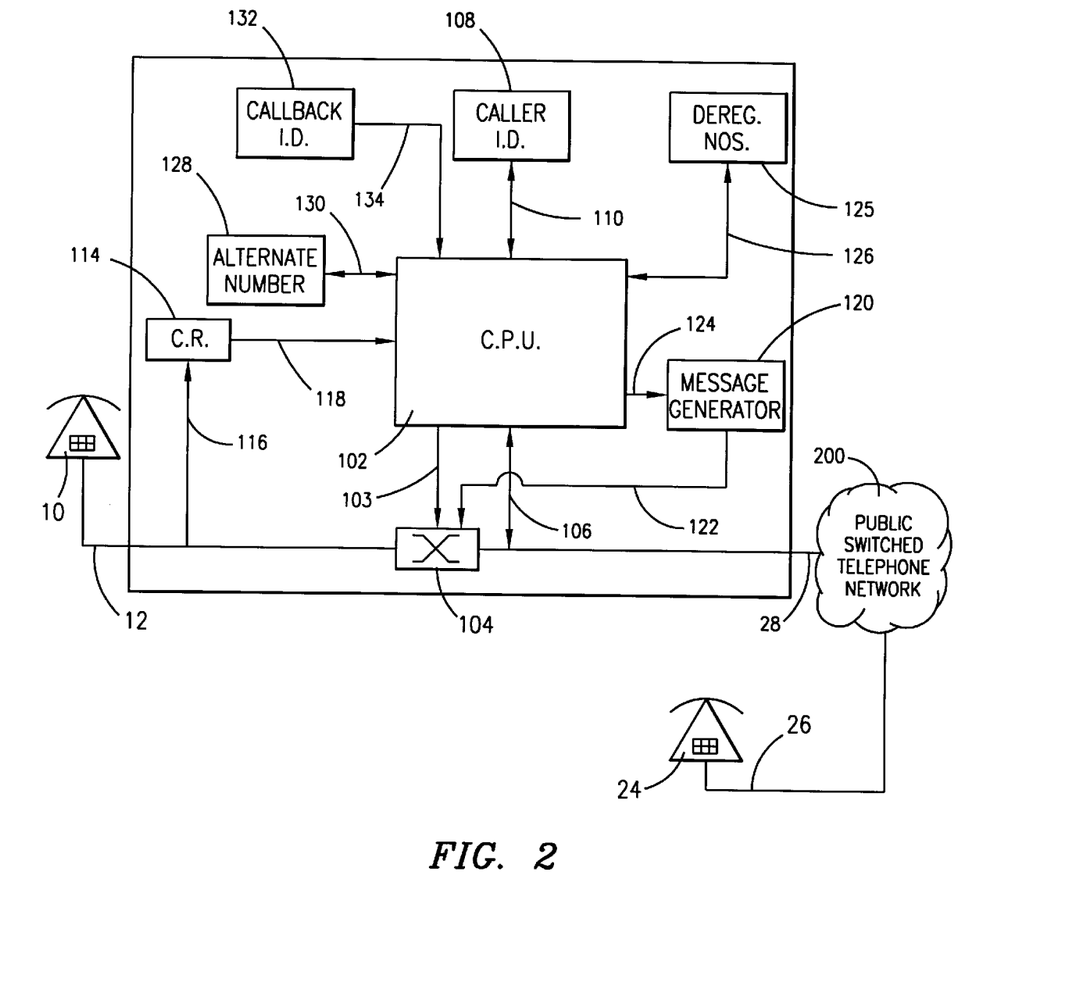
FIG. 2 is a functional block diagram of the call list deregistration system of the present invention.

Referring now to FIG. 2, there is shown a functional block diagram of one embodiment of the CLD 100. Consumer phone 10 is coupled to CLD 100 by line 12. The system of FIG. 2 also illustrates that telemarketer phone 24 is coupled to public switched telephone network 200 (hereinafter "PSTN" 200). Moreover, CLD 100 is shown to be connected to PSTN 200 by a single line 28 which represents at least one phone line used for data and voice. To the extent that this invention is used in an SS7 network, line 28 actually represents a voice trunk as well as a signaling line (not shown) and as voice trunk 18a and signaling line 18b of FIG. 1.

Within CLD 100 there is shown a central processing unit (PU) 102 which sends control signals over line 103 to router 104. Router 104 represents the actual switching router within a local exchange that couples one line to another. In this case, as may be seen, line 12 from consumer phone 10 is coupled to line 28 which eventually is coupled to line 26 and to telemarketer phone 24 over the PSTN 200. A line 106 couples processing unit 102 to line 28. Whenever a call is received from telemarketer phone 24 over line 28, process-ing unit 102 receives and extracts over line 106 necessary information such as the caller ID representing the number of the calling party, transmitted in connection with the set-up of the phone call from phone 24 to phone 10 on line 28. When processing unit 102 extracts a caller ID portion from the signal on line 28, the extracted caller ID portion is transmitted to a caller ID store 108 over line 110. The caller ID store 108 maintains the number of the source of the phone call, namely telemarketer phone 24, to generate the deregistration call back feature of the CLD 100.

When a telemarketing call is originated on telephone 24 and is detected by CLD 100 on line 28, it is routed to consumer phone 10 through router 104. After hanging up from the call received by telemarketer phone 24, if the consumer enters a code on keypad 112 of consumer phone 10, the entered code is transmitted on line 12 to CLD 100. Code receiver (CR) 114, which is coupled to line 12 by line 116, receives and interprets the code generated by the consumer at consumer phone 10 and then sends a signal indicative thereof to processing unit 102 over line 118. The signal transmitted by code receiver 114 may reflect that the specified code for initiating the call back deregistration feature of the present invention has been entered by the consumer at consumer phone 10. Thereafter, processing unit 10 retrieves over line 110 the calling party caller ID portion stored within caller ID store 108 to initiate a deregistration call back to telemarketer phone 24 in order to play a specified message.

After obtaining the previously stored calling party caller ID portion from the caller ID store 108, processing unit 102 initiates a call to connect message generator 120 to telemarketer phone 24 through the PSTN 200. More specifically, processing unit 102 sends control signals to router 104 over line 103 to couple a message generator output line 122 to router 104 to establish a connection to telemarketer phone 24 through PSTN 200.

Following completion of the call connection to telemarketer phone 24, processing unit 102 also transmits to message generator 120 a signal over line 124 to initiate a playback of a specified message to telemarketer phone 24. The signal to message generator 120 from processing unit 102 over line 124 includes the phone number of consumer telephone 10. This way, in one embodiment of the invention, the message generator 120 specified message generated by message generator 120 includes the consumer phone 10 phone number or caller ID. The specified message only varies to the extent that the consumer telephone number varies as this feature is activated by the various consumers which have access to such service.

The system 100 further includes a deregistration number store 125 which is used to maintain a list of telemarketers numbers to which a deregistration call back has been made and for which the message generator has played its specified message. Thus, once the connection between message generator 120 and telemarketer phone 24 has been established and message generator 120 has played its specified message to prompt the telemarketing organization using telemarketer phone 24 to remove the consumer's telephone number from its list, processing unit 102 sends a signal to deregistration number store 125 over line 126 to record completion of the call list deregistration process with respect to consumer phone 10 and telemarketer phone 24. Accordingly, in this embodiment, the signal sent by processing unit 102 over line 126 to deregistration number store 125 includes the phone number or caller ID of consumer phone 10, the date, and the number or caller ID of the telemarketer phone 24.

As another aspect of the invention herein, there is provided an alternate phone number store 128 which is coupled to processing unit 10 by line 130. Alternate phone number store 128 is used to store select phone numbers belonging to the telemarketing organizations for call list deregistration. Accordingly, after processing unit 10 retrieves a caller ID from caller ID store 108, it uses that caller ID to determine if alternate phone store 128 contains a select phone number that should instead be used for the deregistration call back. It is expected that some telemarketing organizations will designate a specific number for consumers to call to request removal from its call lists in order to comply with legal requirements. If processing unit 10 does not find an alternate number in alternate phone number store 128, then it will use the caller ID number to route the deregistration call back to the telemarketing organization to play the specified message.

Once processing unit 10 determines the phone number to be used for routing a deregistration call back, it routes the call back call to the telemarketing organization. To route the call back call to the telemarketing organization, it is necessary to also transmit a caller ID. It is not desirable, however, to use the phone number of consumer phone 10 as a caller ID. In some systems, using the caller ID of the consumer phone can tie up the phone line of consumer phone 10 while the deregistration call back process takes place. Additionally, if the call back is to a long distance number, use of the consumer's caller ID could result in the consumer being charged for the long distance call. Accordingly, CLD 100 includes a deregistration call back ID store 132 which stores a generic caller ID number. Thus, processing unit 102 obtains from deregistration call back ID store 132 over line 134 a "generic" caller ID number for use in all deregistration call backs originating from the telecommunication switch.

It is likely, if a telemarketing organization continues to call the consumer, that the consumer may require evidence that a deregistration call back was made to request that a telemarketing organization remove the consumer from its call lists. Accordingly, as another aspect of the invention, deregistration number store 125 is adapted to download its stored data upon receipt of a command from processing unit 102. Such a downloaded list of deregistration numbers and dates provides useful evidence in a proceeding that a given telemarketer organization has been requested to remove the phone number of a given consumer phone 10 and has failed to do so contrary to its legal obligation to do so.

Figure 3:
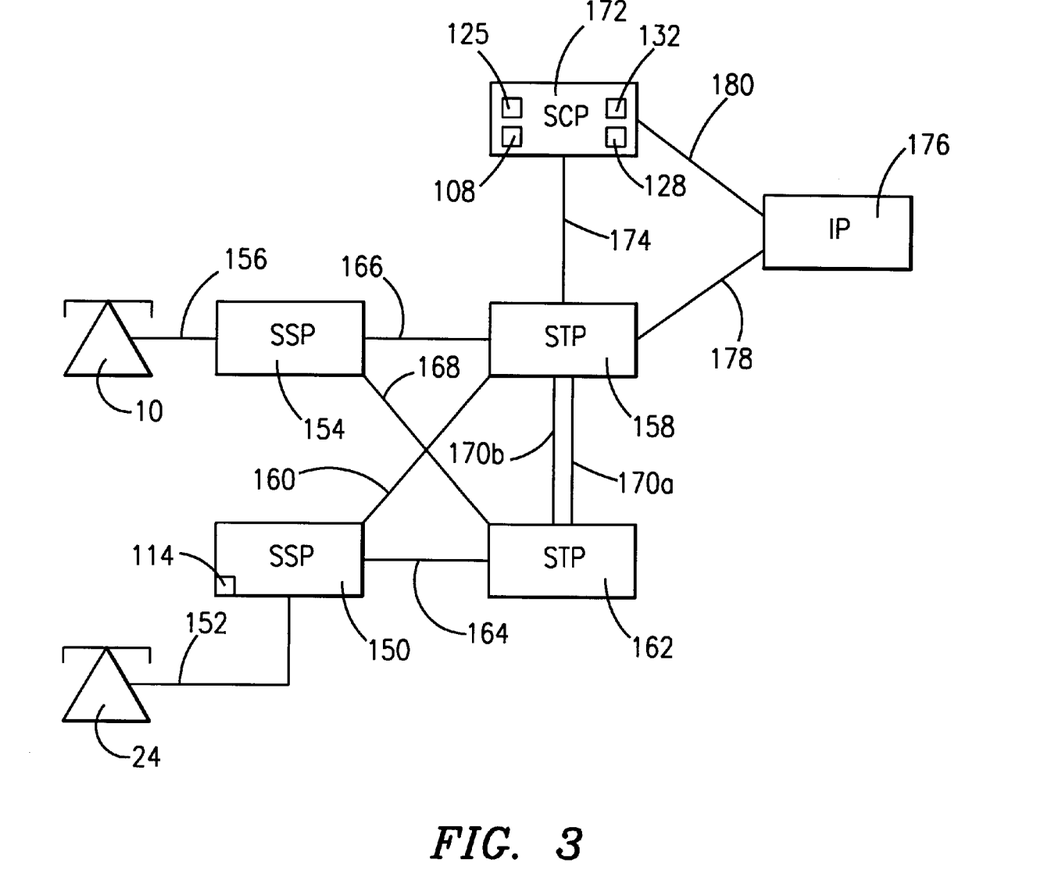
FIG. 3 is a functional diagram illustrating the invention in an intelligent network.

Referring now to FIG. 3, there is shown an alternate embodiment of the present invention. More specifically, the system of FIG. 3 illustrates one embodiment of the invention implemented within an intelligent network ("IN") or an advanced intelligent network ("AIN"). Telemarketer phone 24 is coupled to service switching point ("SSP") 150 by line 152. Consumer phone 10 is coupled to SSP 154 by line 156. SSP 150 is also connected to signal transfer point ("STP") 158 by line 160 and to STP 162 by line 164. Similarly, SSP 154 is coupled to STP 158 by line 166 and to STP 162 by line 168. STP 158 is coupled to STP 162 by lines 170a and 170b. STP 158 is coupled to service control point ("SCP") 172 by line 174 and to intelligent peripheral ("IP") 176 by line 178. SCP 172 also is connected to IP 176 by line 180. It is understood that each of lines 152, 156, 160, 164, 166, 168, 170a, 170b, 174, 178 and 180 may actually represent a plurality of lines within an IN network.

The functionalities found in the embodiments of the systems of FIGS. 1 and 2 are also found in the system of FIG. 3. Thus, message generator 120 is formed within IP 176 while deregistration number store 125, caller ID store 108, call back ID store 132 and alternate phone number store 128 are all formed within SCP 172. Code receiver 114 is formed within SSP 150. The functionality of router 104 is replaced by a combination of SSP 154 and STP 158 and STP 162, as is known to those skilled in the art. As is understood to those skilled in the art, redundant signal paths are created in the IN and AIN network, as can be seen by STP 158 and STP 162 and their redundant connections to SSP 150 and SSP 154 so that telemarketer phone 24 may be connected to consumer phone 10 through more than one path should a line be disabled. As is understood to those skilled in the art, SSP 150 and SSP 154 serve to couple telemarketer phone 24 to consumer phone 10 through either STP 158 or STP 162. The control of such coupling, however, is provided by SCP 172. Thus, SSP 150 interprets an entered phone number on the keypad of telemarketer phone 24 and then requests of SCP 172 through STP 158, routing information for the call being placed. SCP 172 then communicates with SSP 150 over lines 174 and 160 through STP 158 information informing SSP 150 to establish a connection to SSP 154. As a call is received, at SSP 154, SSP 154 communicates to SCP 172 through STP 158 over lines 166 and 174 to determine the proper consumer phone 10 to which the incoming call should be coupled. As such, SCP 172 transmits the control and coupling information to SSP 154 through STP 158 over lines 174 and 166. It is within this IN type architecture that the functionality of the embodiments of FIG. 1 and FIG. 2 are implemented.

Figure 4:
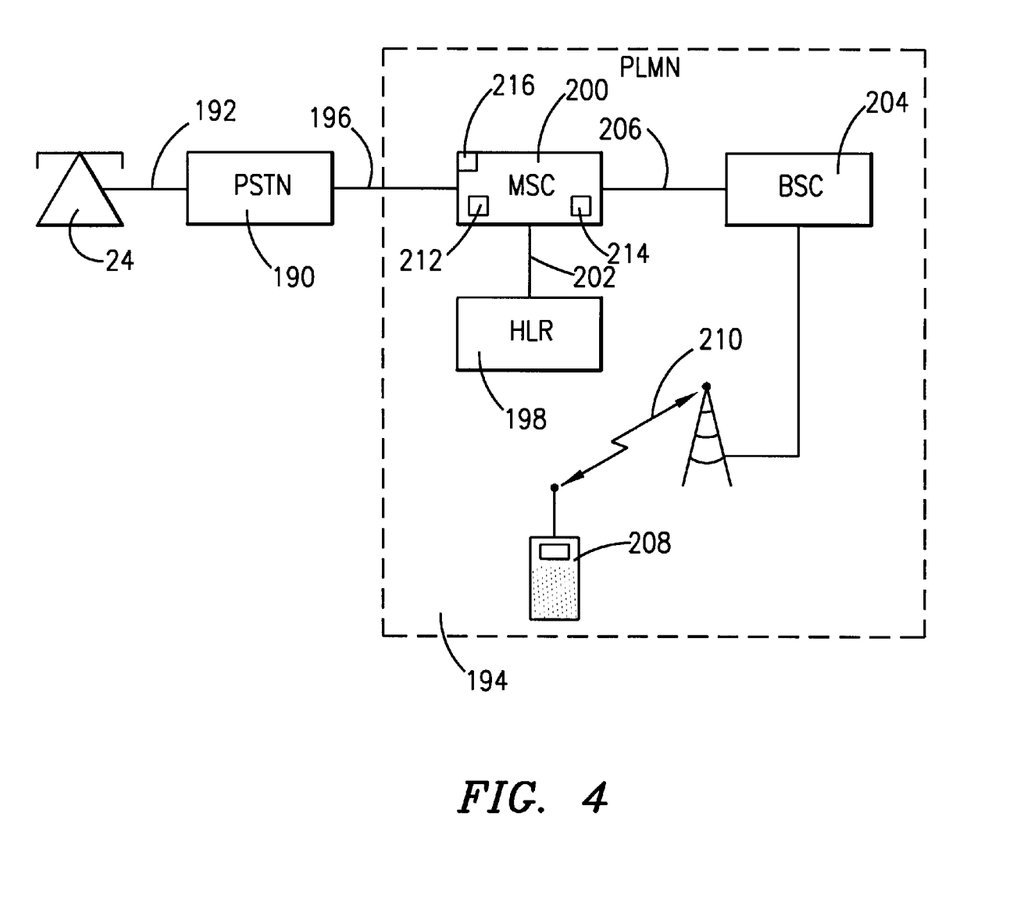
FIG. 4 is a functional block diagram illustrating the invention in a public land mobile network.

Referring now to FIG. 4, there is shown another embodiment of the invention which includes a public land mobile network ("PLMN"). While it is certainly feasible and a part of the invention herein for a mobile network to include all elements of the system of FIGS. 1 or 2 which relate to the invention herein, the system of FIG. 4 is an embodiment which presumes that an originating call from a telemarketing organization is initiated and originated in the public switched telephone network and not by a mobile system. Accordingly, the embodiment of FIG. 4 includes those elements necessary within a PLMN to interface with and take advantage of those elements which are included in a PSTN for this invention, as described in relation to FIGS. 1, 2 and 3.

Telemarketer phone is coupled to PSTN 190 by line 192. PSTN 190 is coupled to PLMN 194 by line 196. PLMN 194 includes a home location register ("HLR") 198 which is coupled to mobile switching center ("MSC") 200 by line 202. MSC 200 is coupled to base station controller ("BSC") 204 by line 206. BSC 204 is communicates with mobile station 208 over communication links 210. MSC 200 includes the capability to receive specified signals originated from BSC 204 or mobile station 208, which specified signals prompt MSC 200 to transmit control signals to PSTN 190 to initiate a call list deregistration.

In operation, when a telemarketing type call is originated at telemarketer phone 24 and routed to PLMN 194 through PSTN 190, MSC 200 is operable to communicate with HLR 198 over line 202 to determine the proper BSC 204 to route the incoming call. In the embodiment of FIG. 4, HLR 198 instructs MSC 200 over line 202 to route the incoming call to BSC 204 over line 206. BSC 204, upon receiving signals on line 206 indicative of an incoming call, transmits signals over communication link 210 to mobile station 208 to establish a communication link. By way of example, BSC 204 causes paging signals to be transmitted within communication link 210 to mobile station 208. Upon response by mobile station 208, as is known by those skilled in the art, a communication link 210 is established as the incoming call originating from telemarketer phone 24 is coupled to communication link 210. As before, after hanging up, the user of mobile station 208 may enter a specified code to cause a call list deregistration request to be made to telemarketer phone 24. In the embodiment of FIG. 4, MSC 200 includes a store 212 for storing the caller ID or originating phone number of telemarketer phone 24 and to store 214 for tracking signals reflective of when MSC 200 transmitted to the PSTN 190 over line 196 signals to initiate a call list deregistration process initiation by PSTN 190. For these purposes, it is transparent to PSTN 190 that the call list deregistration procedure was initiated by mobile station 208 within PLMN 194 rather than by consumer phone 10 coupled to PSTN 190.

It is readily understood that MSC 200 may be modified to include a message generator, a deregistration number store, a caller ID number store, a call back ID store, an alternate phone number store and a code receiver such that the entire invention is implemented solely within a PLMN and is operable without regard for whether the invention is implemented in the PSTN 190 of FIG. 4. The operation of this other embodiment is similar to the operation of the system described in FIG. 2.

As may be seen from the above discussions, the invention disclosed here in this application may be implemented in one of many different systems having different architectures and modes of operation.

Figure 5:
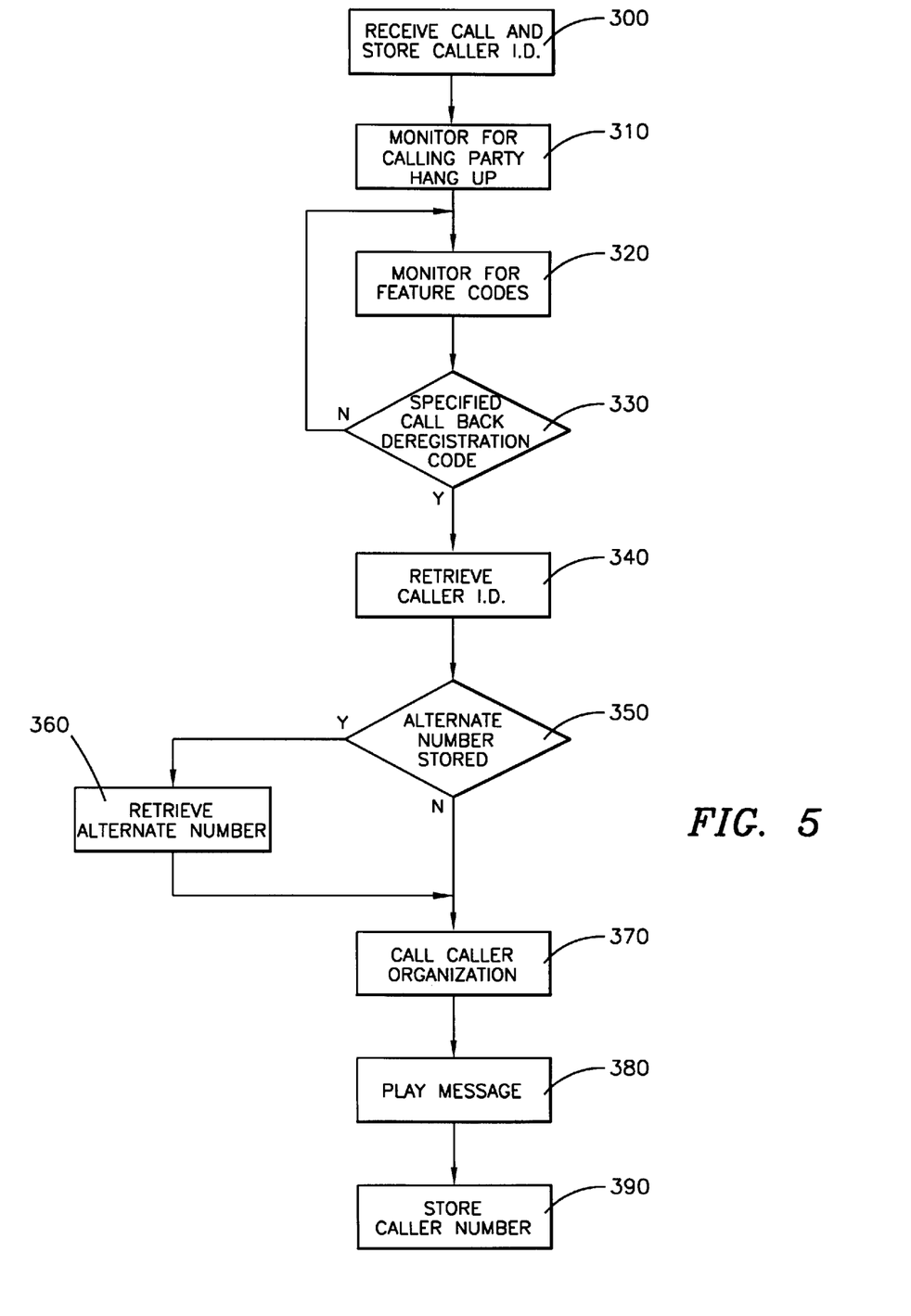
FIG. 5 is a flow diagram illustrating operation of the call list deregistration system of the present invention.

Referring now to FIG. 5, there is shown a flow diagram demonstrating a method for performing a deregistration call back. The method includes storing the caller ID of the caller after a call is received (step 500). After storing the caller ID, the called party line is monitored to determine if the call has terminated, or more specifically, whether the called party phone has transitioned to an idle state (step 510). Once the called party phone has transitioned to an idle state, a code receiver is connected to the line to monitor the line for a specified feature code (step 520). Whenever a feature code is received, then the code receiver analyzes the feature code to determine if it is the specified feature code for initiating a deregistration call back (step 530). Upon the determination that the specified feature code has been depressed by the consumer, by way of example, *69, then the deregistration call back feature is generated.

Once it is determined that the specified deregistration call back feature code has been entered, the caller ID is retrieved (step 540). The caller ID is then used to examine the contents of an alternate phone number store to determine if there is an alternate number for receiving call list deregistration requests for a given telemarketer caller ID or phone number (step 550). If the alternate phone number store includes an alternate phone number, that alternate number is retrieved (step 560). A deregistration call back for playing the specified message to request removal from the telemarketer's call list, then, is set up using either caller ID number or the alternate phone number (step 570).

Thereafter, once a phone line has been established with the telemarketer phone, a message is generated to request that the party at the other end to delete the consumer phone number from its call lists (step 580). The specified message is composed of two parts. The first part is a recorded part which informs the person or party at the other end delete the phone number from its telemarketing lists. The second part is a number part which includes the actual number which is to be deleted. In one embodiment of the invention, the wording of the recorded part is such that the number part, may be generated as a message after the recorded part. In another embodiment of the invention, however, the number part is played at a specified break point in the recorded part of the message. After the specified message has been played to a caller phone, the caller number is stored in a deregistration store so that a log of numbers called back may be maintained for evidentiary purposes (step 590).

One reason for initially determining whether the consumer phone has transitioned to an idle state prior to monitoring the consumer phone line for entry of specified feature codes as recited in step 510, is that it is common to have one code receiver in a local exchange for multiple phone lines, by way of example, one code receiver for every five phone lines rather than one code receiver for every phone line. Accordingly, once a phone line connection is established between two phone lines, the phone line is de-coupled from the code receiver. It is only when the phone becomes idle that the phone line is connected again to a code receiver. As may be seen therefore, the specified codes are only effective in initiating a specialized feature when the specified codes are entered upon termination of a call. Thus, in this embodiment, if a consumer were to enter the specified code while the initial connection from the telemarketer phone to the consumer phone still exists, the local exchange would not respond due to the fact that the code receiver is not coupled to the phone line of the consumer phone.

The foregoing disclosure and description of the invention is illustrative and explanatory thereof and various changes in the details of the illustrated construction as well as the methods may be made without departing from the scope of the invention. It is understood that the invention is not limited to the specific embodiments or methods disclosed above for the purpose of exemplification and that many modifications and changes will be apparent from the descriptions and drawings without departing from the scope of the attached claims.

What is claimed is:

1. A telecommunication system, comprising:
   a plurality of interconnected switching nodes including a first switching node for routing an original call between a calling party and a called party;
   a code receiver within the first switching node for monitoring a line of the called party for determining whether a specified code has been entered by the called party and transmitting a signal indicative thereof;
   a message generator for playing a specified audio message to request removal of the called party from a calling party call list, a called party identification being associated with said specified audio message; and
   a processor within the first switching node coupled to receive and respond to the signal transmitted by the code receiver by initiating a call back to the calling party, connecting the message generator to the calling party line, and activating the message generator to play the specified audio message.

2. The telecommunication system of claim 1, further comprising a first caller ID store for storing a first caller ID of the calling party, wherein the processor uses the first caller ID in calling back the calling party.

3. The communication switch of claim 2, wherein the specified audio message includes a called party ID for identifying the called party to be removed from the calling party call list of the calling party.

4. The telecommunication system of claim 3, further comprising:
   a deregistration store for storing calling party caller IDs to which a call back has occurred and to which the specified audio message has been played.

5. The telecommunication system of claim 4, further comprising a second caller ID store, which second caller ID store includes another caller ID for use instead of the first called party caller ID to call back the calling party.

6. The telecommunication system of claim 5 wherein the telecommunication system is formed within a public land mobile network.

7. The telecommunication system of claim 5 wherein the telecommunication system is formed within a public switched telephone network.

8. The telecommunication system of claim 7 wherein the public switched telephone network is an Intelligent Network.

9. A telecommunication switch for calling back a calling party to perform a deregistration call back requesting removal from a call list, the telecommunication switch comprising:

a caller ID store for storing an alternate caller ID therein; and means for calling back a calling party after a called party line transitions to an idle state, the means for calling back using the alternate caller ID of the caller ID store in place of a called party's caller ID, whereby said deregistration call back requests removal of said called party's caller ID from said call list.

10. The telecommunications switch of claim 9, further comprising;

a telemarketing phone number store for storing specified call back phone numbers for telemarketing organizations, wherein the means for calling back uses a calling party's caller ID to determine if an alternate phone number has been stored for a telemarketer in the telemarketing phone number store, and if an alternate phone number exists, using the alternate number for the call back.

11. A method for calling back a telemarketing organization and prompting said telemarketing organization to remove a consumer's phone number from a call list, the method comprising the steps of:

storing a first caller ID associated with a calling party phone line;

monitoring a called party phone line to determine if a specified call back code has been entered;

setting up a deregistration call back to the telemarketing organization across the calling party phone line;

connecting a message generator to the calling party phone line;

generating a specified message to said telemarketing organization prompting removal of the consumer's phone number, a called party identification being associated with said specified message; and storing or called party identification in a call list deregistration store.

12. The method of claim 11, wherein said called party identification is a second caller ID.

* * * * *

UNITED STATES PATENT AND TRADEMARK OFFICE
CERTIFICATE OF CORRECTION

PATENT NO. : 5,898,770
DATED : Apr. 27, 1999
INVENTOR(S) : Valentine

It is certified that error appears in the above-identified patent and that said Letters Patent is hereby corrected as shown below:

On the title page:

Item [57], line 8    Replace "orgainization"
                     With --organization--

Column 9, line 25    Replace "comprising;"
                     With --comprising:--

Column 10, line 23   After "storing"
                     Insert --the calling party--

Signed and Sealed this

Thirtieth Day of November, 1999

Q. TODD DICKINSON

Attest:

Attesting Officer

Acting Commissioner of Patents and Trademarks